US011067306B1

(12) United States Patent
Jaber et al.

(10) Patent No.: US 11,067,306 B1
(45) Date of Patent: Jul. 20, 2021

(54) SYSTEMS AND METHODS FOR CORRECTING DETECTED TEMPERATURE FOR A CLIMATE CONTROL SYSTEM

(71) Applicant: Trane International Inc., Davidson, NC (US)

(72) Inventors: Youssef A. Jaber, Tyler, TX (US); Christopher Blake Smith, Whitehouse, TX (US); Raymond Walter Rite, Tyler, TX (US)

(73) Assignee: Trane International Inc., Davidson, NC (US)

( * ) Notice: Subject to any disclaimer, the term of this patent is extended or adjusted under 35 U.S.C. 154(b) by 86 days.

(21) Appl. No.: 16/540,925

(22) Filed: Aug. 14, 2019

(51) Int. Cl.
*F24F 11/49* (2018.01)
*G05D 23/32* (2006.01)

(52) U.S. Cl.
CPC .............. *F24F 11/49* (2018.01); *G05D 23/32* (2013.01)

(58) Field of Classification Search
CPC ............ F24F 11/30; F24F 11/49; G05D 23/32
See application file for complete search history.

(56) References Cited

U.S. PATENT DOCUMENTS

| | | | |
|---|---|---|---|
| 4,741,476 A | 5/1988 | Russo et al. | |
| 5,199,637 A | 4/1993 | Adams | |
| 6,971,790 B2 | 12/2005 | Quinn et al. | |
| 7,364,353 B2 | 4/2008 | Kolk | |
| 7,784,705 B2 | 8/2010 | Kasper et al. | |
| 9,335,769 B2 | 5/2016 | Aljabari et al. | |
| 9,765,984 B2 | 9/2017 | Smith et al. | |
| 2004/0114659 A1 | 6/2004 | Quinn et al. | |
| 2013/0099008 A1* | 4/2013 | Aljabari | G01K 7/427 236/1 C |
| 2015/0028115 A1* | 1/2015 | Hess | H05B 1/028 236/78 R |
| 2017/0046207 A1* | 2/2017 | Krauss | G06F 9/5016 |
| 2017/0059190 A1* | 3/2017 | Stefanski | G05D 23/193 |
| 2018/0143084 A1* | 5/2018 | Diether | G01K 1/20 |
| 2019/0178511 A1 | 6/2019 | Zimmerman et al. | |

FOREIGN PATENT DOCUMENTS

WO   WO 0169341 A2   9/2001

* cited by examiner

*Primary Examiner* — Marc E Norman
(74) *Attorney, Agent, or Firm* — Womble Bond Dickinson (US)

(57) ABSTRACT

Methods and related systems for measuring a temperature with an onboard sensor of a device of a heating, ventilation, and air conditioning (HVAC) system are disclosed. In an embodiment, the method includes (a) changing a power state of the device from off to on, and (b) detecting a raw temperature with the sensor after (a). In addition, the method includes (c) determining a time offset along a predetermined time and temperature relationship for the device, and (d) calculating a temperature offset with the predetermined time and temperature relationship at the time offset. Further, the method includes (e) subtracting the temperature offset from the raw temperature.

14 Claims, 4 Drawing Sheets

SYSTEMS AND METHODS FOR CORRECTING DETECTED TEMPERATURE FOR A CLIMATE CONTROL SYSTEM

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

A climate control system, such as a heating, ventilation, and air conditioning (HVAC) system, may control the environmental conditions (e.g., temperature, relative humidity, etc.) of an indoor space. A climate control system may include a thermostat that may receive user inputs (e.g., such as a desired indoor temperature and relative humidity) and detect the environmental conditions of the indoor space. Accordingly, a thermostat may include a temperature sensor that is to measure a temperature of the indoor space, and these temperature measurements may be utilized to determine whether and/or how to operate the climate control system.

BRIEF SUMMARY

Some embodiments disclosed herein a directed to a method of measuring a temperature with an onboard sensor of a device of a heating, ventilation, and air conditioning (HVAC) system. In an embodiment, the method includes (a) changing a power state of the device from off to on, and (b) detecting a raw temperature with the sensor after (a). In addition, the method includes (c) determining a time offset along a predetermined time and temperature relationship for the device, (d) calculating a temperature offset with the predetermined time and temperature relationship at the time offset, and (e) subtracting the temperature offset from the raw temperature.

Other embodiments disclosed herein are directed to a non-transitory machine-readable medium including instructions that, when executed by a processor, cause the processor to: (a) detect a raw temperature of the environment surrounding a device of a climate control system with an onboard sensor upon a change in a power state of the device from off to on; (b) determine a time offset along a predetermined time and temperature relationship for the device; (c) calculate a temperature offset with the predetermined time and temperature relationship at the time offset; and (d) subtract the temperature offset from the raw temperature.

Still other embodiments disclosed herein are directed to a thermostat for a heating, ventilation, and air conditioning (HVAC) system. In an embodiment, the thermostat includes a temperature sensor, and a processor coupled to the temperature sensor. The processor is configured to: (a) detect a raw temperature of the environment surrounding the thermostat via the temperature sensor upon a change in a power state of the thermostat from off to on; (b) determine a time offset along a predetermined time and temperature relationship; (c) calculate a temperature offset with the predetermined time and temperature relationship at the time offset; and (d) subtract the temperature offset from the raw temperature.

Embodiments described herein comprise a combination of features and characteristics intended to address various shortcomings associated with certain prior devices, systems, and methods. The foregoing has outlined rather broadly the features and technical characteristics of the disclosed embodiments in order that the detailed description that follows may be better understood. The various characteristics and features described above, as well as others, will be readily apparent to those skilled in the art upon reading the following detailed description, and by referring to the accompanying drawings. It should be appreciated that the conception and the specific embodiments disclosed may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

For a detailed description of various exemplary embodiments, reference will now be made to the accompanying drawings in which.

DETAILED DESCRIPTION

Figure 1:
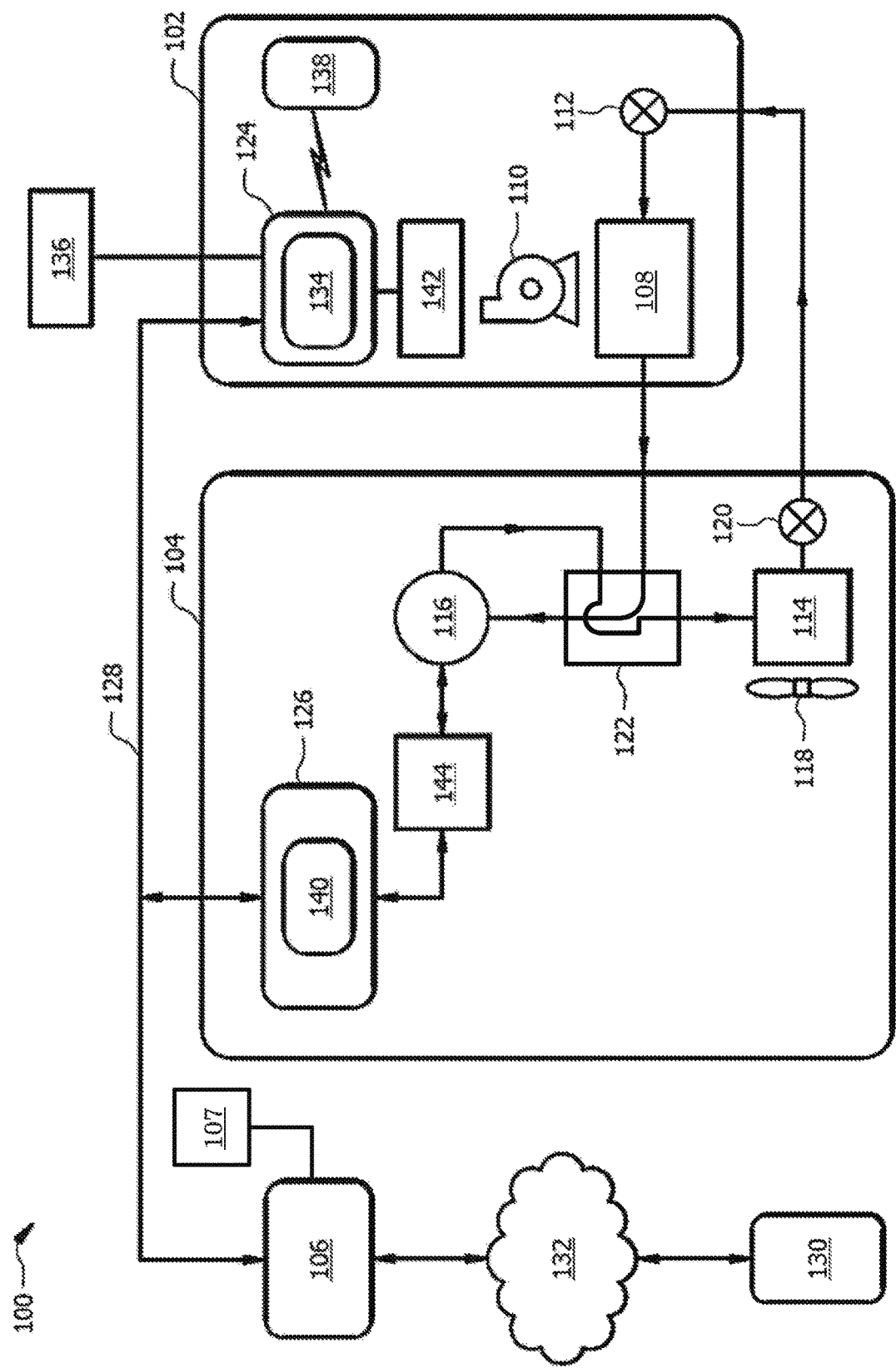
FIG. 1 is a diagram of a HVAC system configured for operating in a cooling mode according to some embodiments.

The following discussion is directed to various exemplary embodiments. However, one of ordinary skill in the art will understand that the examples disclosed herein have broad application, and that the discussion of any embodiment is meant only to be exemplary of that embodiment, and not intended to suggest that the scope of the disclosure, including the claims, is limited to that embodiment.

The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection of the two devices, or through an indirect connection that is established via other devices, components, nodes, and connections. In addition, as used herein, the terms "axial" and "axially" generally mean along or parallel to a given axis (e.g., central axis of a body or a port), while the terms "radial" and "radially" generally mean perpendicular to the given axis. For instance, an axial distance refers to a distance measured along or parallel to the axis, and a radial distance means a distance measured perpendicular to the axis. Further, when used herein (including in the claims), the words "about,"

"generally," "substantially," "approximately," and the like mean within a range of plus or minus 10% unless otherwise stated herein.

As previously described, a thermostat, of a climate control system may include a temperature sensor that is to monitor the temperature of the indoor space such that the climate control system may be effectively and efficiently operated to control the environmental conditions within the indoor space. However, other components within the thermostat (e.g., a display, processors, memories, etc.) may generate heat during operations. As a result, the temperatures detected by the temperature sensor may be elevated and thus not reflect the actual temperatures within the indoor space. These inaccuracies may be exacerbated during a period immediately following a start-up or energization of the thermostat, where the heat generated by the internal components within the thermostat may be dynamically changing. As a result accurate and efficient operation of the climate control system may be frustrated. Accordingly, embodiments disclosed herein include systems and methods for correcting the temperature measured by an onboard sensor of a thermostat or other suitable device associated with a climate control system so as to help ensure efficient and desired operation of the climate control system. Some embodiments include a system and method for correcting raw temperatures detected by an onboard sensor during a dynamic start-up period for the thermostat.

Referring now to FIG. 1, a schematic diagram of a climate control system 100 according to some embodiments is shown. In this embodiment, climate control system 100 is an HVAC system, and thus, system 100 may be referred to herein as HVAC system 100. Most generally, HVAC system 100 comprises a heat pump system that may be selectively operated to implement one or more substantially closed thermodynamic refrigeration cycles to provide a cooling functionality (hereinafter "cooling mode") and/or a heating functionality (hereinafter "heating mode"). The HVAC system 100, configured as a heat pump system, generally comprises an indoor unit 102, an outdoor unit 104, and a system controller 106 that may generally control operation of the indoor unit 102 and/or the outdoor unit 104.

Indoor unit 102 generally comprises an indoor air handling unit comprising an indoor heat exchanger 108, an indoor fan 110, an indoor metering device 112, and an indoor controller 124. The indoor heat exchanger 108 may generally be configured to promote heat exchange between refrigerant carried within internal tubing of the indoor heat exchanger 108 and an airflow that may contact the indoor heat exchanger 108 but that is segregated from the refrigerant. In some embodiments, the indoor heat exchanger 108 may comprise a plate-fin heat exchanger. However, in other embodiments, indoor heat exchanger 108 may comprise a microchannel heat exchanger and/or any other suitable type of heat exchanger.

The indoor fan 110 may generally comprise a centrifugal blower comprising a blower housing, a blower impeller at least partially disposed within the blower housing, and a blower motor configured to selectively rotate the blower impeller. The indoor fan 110 may generally be configured to provide airflow through the indoor unit 102 and/or the indoor heat exchanger 108 to promote heat transfer between the airflow and a refrigerant flowing through the indoor heat exchanger 108. The indoor fan 110 may also be configured to deliver temperature-conditioned air from the indoor unit 102 to one or more areas and/or zones of an indoor space. The indoor fan 110 may generally comprise a mixed-flow fan and/or any other suitable type of fan. The indoor fan 110 may generally be configured as a modulating and/or variable speed fan capable of being operated at many speeds over one or more ranges of speeds. In other embodiments, the indoor fan 110 may be configured as a multiple speed fan capable of being operated at a plurality of operating speeds by selectively electrically powering different ones of multiple electromagnetic windings of a motor of the indoor fan 110. In yet other embodiments, however, the indoor fan 110 may be a single speed fan.

The indoor metering device 112 may generally comprise an electronically-controlled motor-driven electronic expansion valve (EEV). In some embodiments, however, the indoor metering device 112 may comprise a thermostatic expansion valve, a capillary tube assembly, and/or any other suitable metering device. In some embodiments, while the indoor metering device 112 may be configured to meter the volume and/or flow rate of refrigerant through the indoor metering device 112, the indoor metering device 112 may also comprise and/or be associated with a refrigerant check valve and/or refrigerant bypass configuration when the direction of refrigerant flow through the indoor metering device 112 is such that the indoor metering device 112 is not intended to meter or otherwise substantially restrict flow of the refrigerant through the indoor metering device 112.

Outdoor unit 104 generally comprises an outdoor heat exchanger 114, a compressor 116, an outdoor fan 118, an outdoor metering device 120, a reversing valve 122, and an outdoor controller 126. In some embodiments, the outdoor unit 104 may also comprise a plurality of temperature sensors for measuring the temperature of the outdoor heat exchanger 114, the compressor 116, and/or the outdoor ambient temperature. The outdoor heat exchanger 114 may generally be configured to promote heat transfer between a refrigerant carried within internal passages or tubing of the outdoor heat exchanger 114 and an airflow that contacts the outdoor heat exchanger 114 but that is segregated from the refrigerant. In some embodiments, outdoor heat exchanger 114 may comprise a plate-fin heat exchanger. However, in other embodiments, outdoor heat exchanger 114 may comprise a spine-fin heat exchanger, a microchannel heat exchanger, or any other suitable type of heat exchanger.

The compressor 116 may generally comprise a variable speed scroll-type compressor that may generally be configured to selectively pump refrigerant at a plurality of mass flow rates through the indoor unit 102, the outdoor unit 104, and/or between the indoor unit 102 and the outdoor unit 104. In some embodiments, the compressor 116 may comprise a rotary type compressor configured to selectively pump refrigerant at a plurality of mass flow rates. In some embodiments, however, the compressor 116 may comprise a modulating compressor that is capable of operation over a plurality of speed ranges, a reciprocating-type compressor, a single speed compressor, and/or any other suitable refrigerant compressor and/or refrigerant pump. In some embodiments, the compressor 116 may be controlled by a compressor drive controller 144, also referred to as a compressor drive and/or a compressor drive system.

The outdoor fan 118 may generally comprise an axial fan comprising a fan blade assembly and fan motor configured to selectively rotate the fan blade assembly. The outdoor fan 118 may generally be configured to provide airflow through the outdoor unit 104 and/or the outdoor heat exchanger 114 to promote heat transfer between the airflow and a refrigerant flowing through the indoor heat exchanger 108. The outdoor fan 118 may generally be configured as a modulating and/or variable speed fan capable of being operated at a plurality of speeds over a plurality of speed ranges. In other embodiments, the outdoor fan 118 may comprise a mixed-flow fan, a centrifugal blower, and/or any other suitable type of fan and/or blower, such as a multiple speed fan capable of being operated at a plurality of operating speeds by selectively electrically powering different multiple electromagnetic windings of a motor of the outdoor fan 118. In yet other embodiments, the outdoor fan 118 may be a single speed fan. Further, in other embodiments, the outdoor fan 118 may comprise a mixed-flow fan, a centrifugal blower, and/or any other suitable type of fan and/or blower.

The outdoor metering device 120 may generally comprise a thermostatic expansion valve. In some embodiments, however, the outdoor metering device 120 may comprise an electronically-controlled motor driven EEV similar to indoor metering device 112, a capillary tube assembly, and/or any other suitable metering device. In some embodiments, while the outdoor metering device 120 may be configured to meter the volume and/or flow rate of refrigerant through the outdoor metering device 120, the outdoor metering device 120 may also comprise and/or be associated with a refrigerant check valve and/or refrigerant bypass configuration when the direction of refrigerant flow through the outdoor metering device 120 is such that the outdoor metering device 120 is not intended to meter or otherwise substantially restrict flow of the refrigerant through the outdoor metering device 120.

The reversing valve 122 may generally comprise a four-way reversing valve. The reversing valve 122 may also comprise an electrical solenoid, relay, and/or other device configured to selectively move a component of the reversing valve 122 between operational positions to alter the flow path of refrigerant through the reversing valve 122 and consequently the HVAC system 100. Additionally, the reversing valve 122 may also be selectively controlled by the system controller 106 and/or an outdoor controller 126.

The system controller 106 may generally be configured to selectively communicate with an indoor controller 124 of the indoor unit 102, an outdoor controller 126 of the outdoor unit 104, and/or other components of the HVAC system 100. In some embodiments, the system controller 106 may be configured to control operation of the indoor unit 102 and/or the outdoor unit 104. In some embodiments, the system controller 106 may be configured to monitor and/or communicate, directly or indirectly, with a plurality of sensors associated with components of the indoor unit 102, the outdoor unit 104, etc. The sensors may measure or detect a variety of parameters, such as, for example, pressure, temperature, and flow rate of the refrigerant as well as pressure and temperature of other components or fluids of or associated with HVAC system 100. In some embodiments, the HVAC system 100 may include a sensor (or plurality of sensors) for sensing or detecting the ambient outdoor temperature. Additionally, in some embodiments, the system controller 106 may be configured to control heating and/or cooling of zones associated with the HVAC system 100 (e.g., within the indoor space).

The system controller 106 may also be in communication with or incorporated with an input/output (I/O) unit 107 (e.g., a graphical user interface, a touchscreen interface, or the like) for displaying information and for receiving user inputs. The I/O unit 107 may display information related to the operation of the HVAC system 100 (e.g., from system controller 106) and may receive user inputs related to operation of the HVAC system 100. During operations, I/O unit 107 may communicate received user inputs to the system controller 106, which may then execute control of HVAC system 100 accordingly. Communication between the I/O unit 107 and system controller 106 may be wired, wireless, or a combination thereof. In some embodiments, the I/O unit 107 may further be operable to display information and receive user inputs tangentially and/or unrelated to operation of the HVAC system 100. In some embodiments, however, the I/O unit 107 may not comprise a display and may derive all information from inputs from remote sensors and remote configuration tools (e.g., remote computers, servers, smartphones, tablets, etc.). In some embodiments, system controller 106 may receive user inputs from remote configuration tools, and may further communicate information relating to HVAC system 100 to I/O unit 107. In these embodiments, system controller 106 may or may not also receive user inputs via I/O unit 107. In some embodiments, the system controller 106 and/or the I/O unit 107 may be embodied in a thermostat that may be disposed within the indoor space (e.g., thermostat 150 discussed below). As will be described in more detail below, such a thermostat (not specifically shown in FIG. 2) may include an onboard temperature sensor for determining the temperature of the indoor space during operations.

In some embodiments, the system controller 106 may be configured for selective bidirectional communication over a communication bus 128. In some embodiments, portions of the communication bus 128 may comprise a three-wire connection suitable for communicating messages between the system controller 106 and one or more of the HVAC system 100 components configured for interfacing with the communication bus 128. Still further, the system controller 106 may be configured to selectively communicate with HVAC system 100 components and/or any other device 130 via a communication network 132. In some embodiments, the communication network 132 may comprise a telephone network, and the other device 130 may comprise a telephone. In some embodiments, the communication network 132 may comprise the Internet, and the other device 130 may comprise a smartphone and/or other Internet-enabled mobile telecommunication device. In other embodiments, the communication network 132 may also comprise a remote server.

The indoor controller 124 may be carried by the indoor unit 102 and may generally be configured to receive information inputs, transmit information outputs, and/or otherwise communicate with the system controller 106, the outdoor controller 126, and/or any other device 130 via the communication bus 128 and/or any other suitable medium of communication. In some embodiments, the indoor controller 124 may be configured to communicate with an indoor personality module 134 that may comprise information related to the identification and/or operation of the indoor unit 102. In some embodiments, the indoor controller 124 may be configured to receive information related to a speed of the indoor fan 110, transmit a control output to an electric heat relay, transmit information regarding an indoor fan 110 volumetric flow-rate, communicate with and/or otherwise affect control over an air cleaner 136, and communicate with an indoor EEV controller 138. In some embodiments, the indoor controller 124 may be configured to communicate with an indoor fan controller 142 and/or otherwise affect control over operation of the indoor fan 110. In some embodiments, the indoor personality module 134 may comprise information related to the identification and/or operation of the indoor unit 102 and/or a position of the outdoor metering device 120.

The indoor EEV controller 138 may be configured to receive information regarding temperatures and/or pressures of the refrigerant in the indoor unit 102. More specifically, the indoor EEV controller 138 may be configured to receive information regarding temperatures and pressures of refrigerant entering, exiting, and/or within the indoor heat exchanger 108. Further, the indoor EEV controller 138 may be configured to communicate with the indoor metering device 112 and/or otherwise affect control over the indoor metering device 112. The indoor EEV controller 138 may also be configured to communicate with the outdoor metering device 120 and/or otherwise affect control over the outdoor metering device 120.

The outdoor controller 126 may be carried by the outdoor unit 104 and may be configured to receive information inputs, transmit information outputs, and/or otherwise communicate with the system controller 106, the indoor controller 124, and/or any other device 130 via the communication bus 128 and/or any other suitable medium of communication. In some embodiments, the outdoor controller 126 may be configured to communicate with an outdoor personality module 140 that may comprise information related to the identification and/or operation of the outdoor unit 104. In some embodiments, the outdoor controller 126 may be configured to receive information related to an ambient temperature associated with the outdoor unit 104, information related to a temperature of the outdoor heat exchanger 114, and/or information related to refrigerant temperatures and/or pressures of refrigerant entering, exiting, and/or within the outdoor heat exchanger 114 and/or the compressor 116. In some embodiments, the outdoor controller 126 may be configured to transmit information related to monitoring, communicating with, and/or otherwise affecting control over the compressor 116, the outdoor fan 118, a solenoid of the reversing valve 122, a relay associated with adjusting and/or monitoring a refrigerant charge of the HVAC system 100, a position of the indoor metering device 112, and/or a position of the outdoor metering device 120. The outdoor controller 126 may further be configured to communicate with and/or control a compressor drive controller 144 that is configured to electrically power and/or control the compressor 116.

System controller 106, indoor controller 124, and outdoor controller 126 (as well as compressor drive controller 144, indoor fan controller 142, indoor EEV controller 138, etc.) may each comprise any suitable device or assembly which is capable of receiving electrical (or other data) signals and transmitting electrical (or other data) signals to other devices. In particular, while not specifically shown, system controller 106, indoor controller 124, and outdoor controller 126 (as well as controllers 138, 142, 144, etc.) may each include a processor and a memory. The processors (e.g., microprocessor, central processing unit, or collection of such processor devices, etc.) may execute machine readable instructions (e.g., non-transitory machine readable medium) provided on the corresponding memory to provide the processor with all of the functionality described herein. The memory of each controller 106, 124, 126 may comprise volatile storage (e.g., random access memory), non-volatile storage (e.g., flash storage, read only memory, etc.), or combinations of both volatile and non-volatile storage. Data consumed or produced by the machine readable instructions can also be stored on the memory of controllers 106, 124, 126.

As shown in FIG. 1, the HVAC system 100 is configured for operating in a so-called cooling mode in which heat may generally be absorbed by refrigerant at the indoor heat exchanger 108 and rejected from the refrigerant at the outdoor heat exchanger 114. Starting at the compressor 116, the compressor 116 may be operated to compress refrigerant and pump the relatively high temperature and high pressure compressed refrigerant through the reversing valve 122 and to the outdoor heat exchanger 114, where the refrigerant may transfer heat to an airflow that is passed through and/or into contact with the outdoor heat exchanger 114 by the outdoor fan 118. After exiting the outdoor heat exchanger 114, the refrigerant may flow through and/or bypass the outdoor metering device 120, such that refrigerant flow is not substantially restricted by the outdoor metering device 120. Refrigerant generally exits the outdoor metering device 120 and flows to the indoor metering device 112, which may meter the flow of refrigerant through the indoor metering device 112, such that the refrigerant downstream of the indoor metering device 112 is at a lower pressure than the refrigerant upstream of the indoor metering device 112. From the indoor metering device 112, the refrigerant may enter the indoor heat exchanger 108. As the refrigerant is passed through the indoor heat exchanger 108, heat may be transferred to the refrigerant from an airflow that is passed through and/or into contact with the indoor heat exchanger 108 by the indoor fan 110. Refrigerant leaving the indoor heat exchanger 108 may flow to the reversing valve 122, where the reversing valve 122 may be selectively configured to divert the refrigerant back to the compressor 116, where the refrigeration cycle may begin again.

Figure 2:
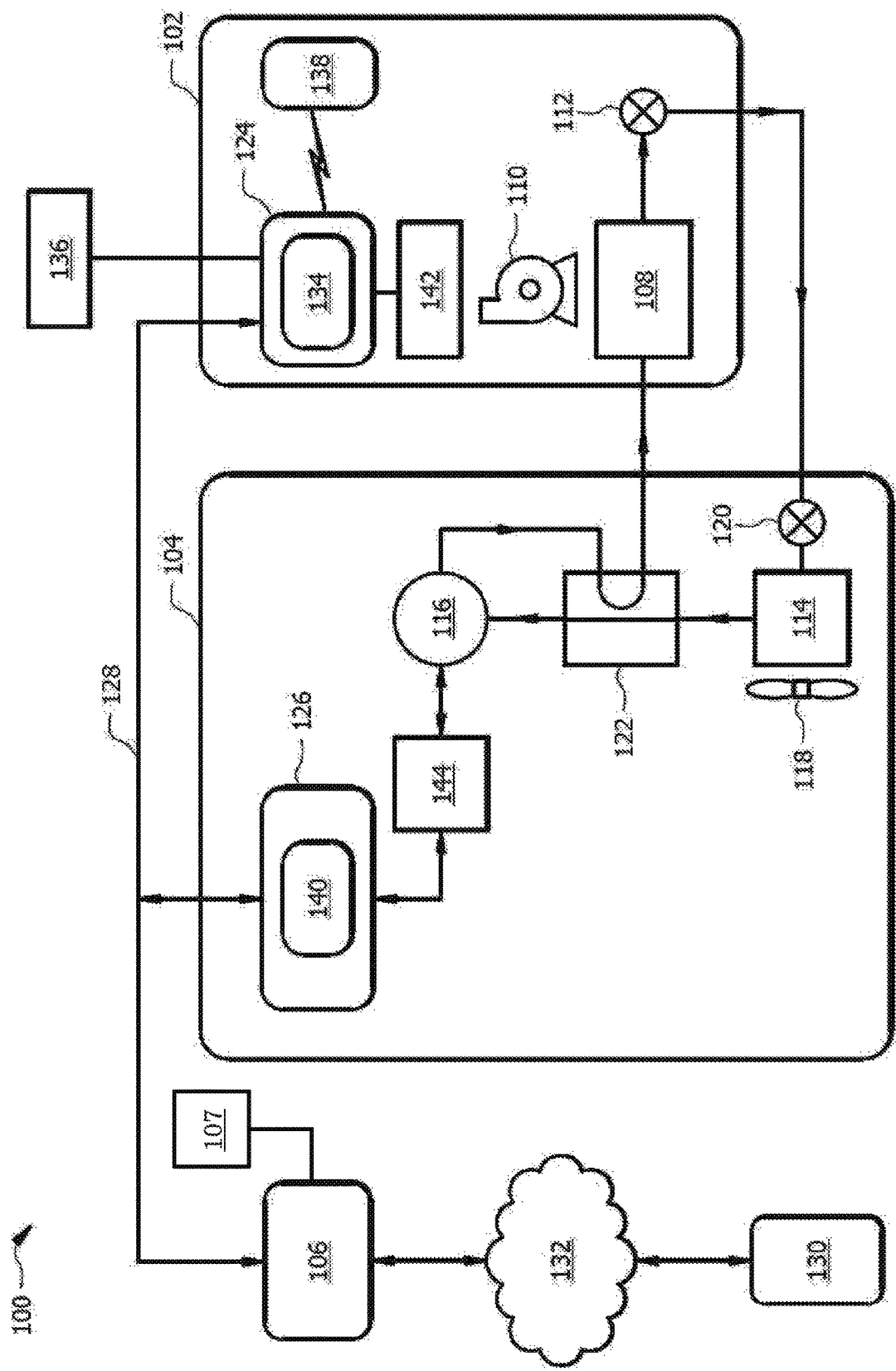
FIG. 2 is a diagram of the HVAC system of FIG. 1 configured for operating in a heating mode according to some embodiments.

Reference is now made to FIG. 2, which shows the HVAC system 100 configured for operating in a so-called heating mode. Most generally, the roles of the indoor heat exchanger 108 and the outdoor heat exchanger 114 are reversed as compared to their operation in the above-described cooling mode. For example, the reversing valve 122 may be controlled to alter the flow path of the refrigerant from the compressor 116 to the indoor heat exchanger 108 first and then to the outdoor heat exchanger 114, the outdoor metering device 120 may be enabled, and the indoor metering device 112 may be disabled and/or bypassed. In heating mode, heat may generally be absorbed by refrigerant at the outdoor heat exchanger 114 and rejected by the refrigerant at the indoor heat exchanger 108. As the refrigerant is passed through the outdoor heat exchanger 114, the outdoor fan 118 may be operated to move air into contact with the outdoor heat exchanger 114, thereby transferring heat to the refrigerant from the air surrounding the outdoor heat exchanger 114. Additionally, as refrigerant is passed through the indoor heat exchanger 108, the indoor fan 110 may be operated to move air into contact with the indoor heat exchanger 108, thereby transferring heat from the refrigerant to the air surrounding the indoor heat exchanger 108.

Figure 3:
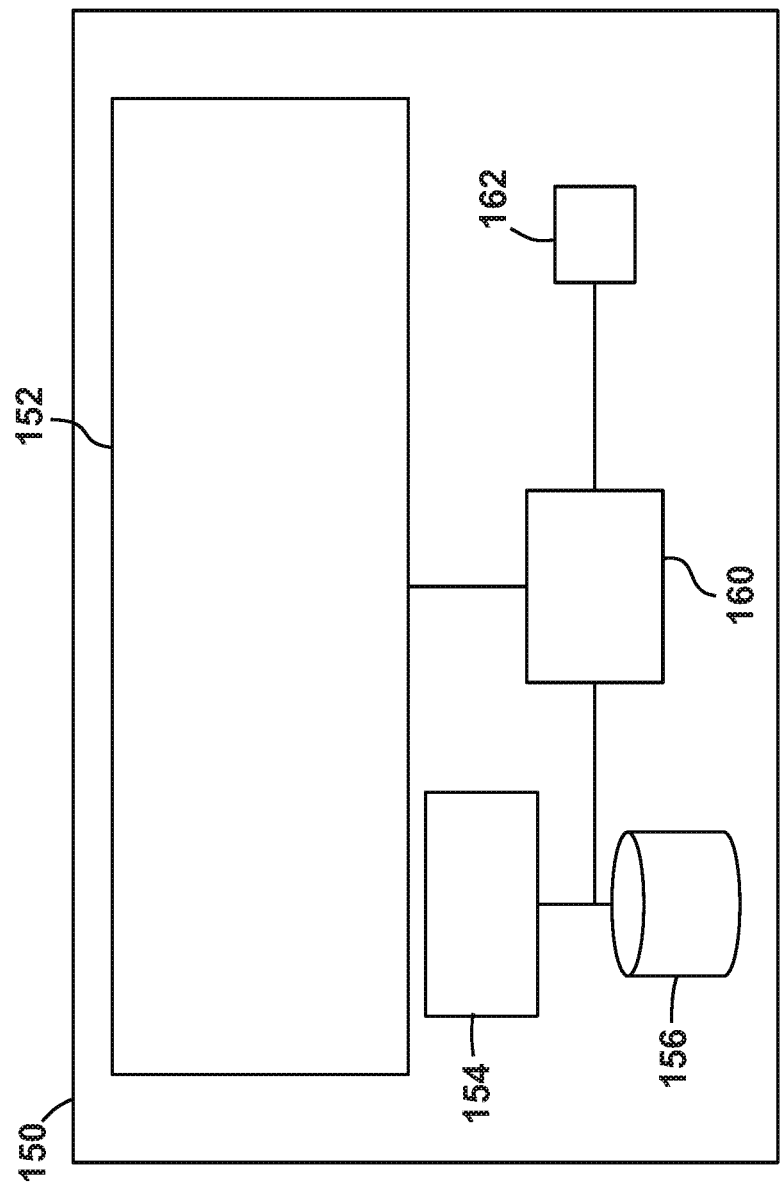
FIG. 3 is a diagram of a thermostat for use with the HVAC system of FIG. 1 according to some embodiments.

Referring now to FIG. 3, a thermostat 150 is shown that may be utilized within HVAC system 100 (see e.g., FIG. 1). As previously described above, in some embodiments, thermostat 150 may embody the system controller 106, I/O unit 107, indoor controller 124, or a combination thereof. In other embodiments, thermostat 150 may be a separate device from the system controller 106, I/O unit 107, indoor controller 124, etc., but may be configured to communicate (e.g., via wired and/or wireless communication) with these components. Generally speaking, thermostat 150 includes a display 152, a processor 160, a memory 156, a power source 154, and an onboard temperature sensor 162 all coupled together.

Display 152 is an electronic display that is to project or display images generated by an associated electronic device (e.g., processor 160). Display 152 may comprise any suitable display (or combination thereof), such as, for example, a liquid crystal display (LCD), an organic light emitting diode (OLED) display, an electrophoretic display, a plasma display, etc. In some embodiments, display 152 is a touch sensitive display. In some embodiments, thermostat 150 may not include a display 152.

The processor 160 (e.g., microprocessor, central processing unit, or collection of such processor devices, etc.) executes machine-readable instructions (e.g., non-transitory machine-readable medium) provided on memory 156 to provide the processor 160 with all of the functionality described herein. The memory 156 may comprise volatile storage (e.g., random access memory), non-volatile storage (e.g., flash storage, read only memory, etc.), or combinations of both volatile and non-volatile storage. Data consumed or produced by the machine-readable instructions can also be stored on memory 156.

Power source 154 provides electrical power to other electronic components within thermostat 150 (e.g., processor 160, memory 156, temperature sensor 162, display 152, etc.). Power source 154 may comprise any suitable source of electrical power such as, for example, a battery, capacitor, a converter or transformer, etc. In addition, in some examples, thermostat 150 may also receive electrical power from wires or other conductors coupled to an electrical power supply for the indoor space. Therefore, in some examples, power source 154 is not included in thermostat 150, and all electrical power is supplied to thermostat 150 from the electrical power supply for the indoor space.

Temperature sensor 162 may comprise any suitable device or collection of devices for measuring a temperature (or value(s) indicative thereof) for an environment surrounding the thermostat 150. For instance, temperature sensor 162 may comprise a thermos-couple, thermistor, infrared sensor, etc. More specifically, because the thermostat 150 is disposed within the indoor space, the temperature sensor 162 may be configured to detect the temperature of the indoor space, specifically the portion of the indoor space that immediately surrounds the thermostat 150 (as well as within the thermostat 150 itself). During operations, heat that is generated by the other electronic components of thermostat 150 (e.g., display 152, processor 160, memory 156, etc.) may cause the temperature measured or detected by temperature sensor 162 to be inconsistent with the air temperature in the majority of the indoor space. That is, the temperature of the air within and immediately surrounding thermostat 150 may be higher than the air within the rest of the indoor space. As a result, processor 160 may apply a temperature offset to the raw temperature value provided from temperature sensor 162, and thereby produce a corrected temperature measurement (which may be used for operation of the HVAC system 100 more generally). Accordingly, embodiments of methods are described below that may be used by processor 160 to apply a proper offset to the raw temperature values from temperature sensor 162 based on the operational state of the thermostat 150 itself.

Figure 4:
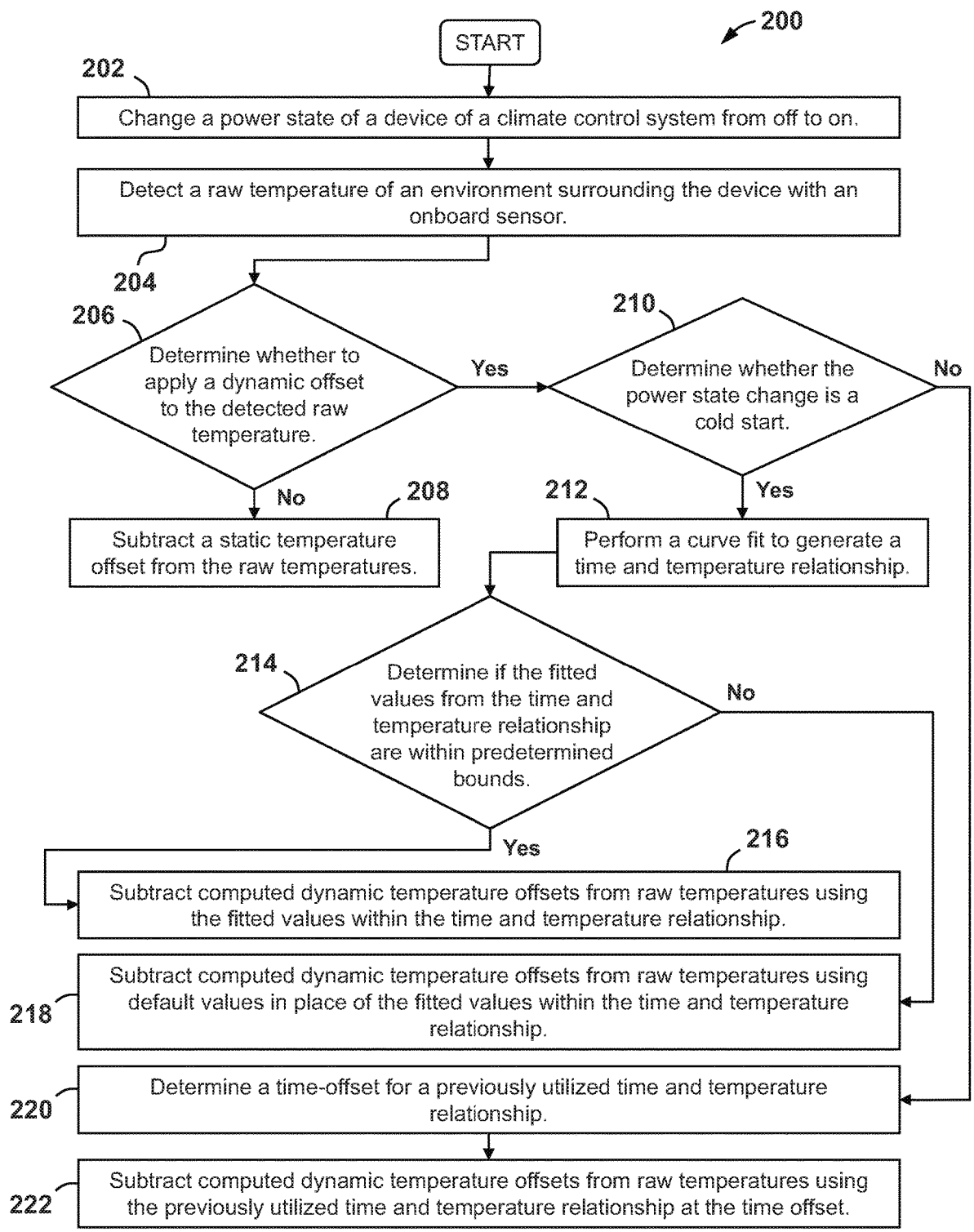
FIG. 4 is a flow chart of a method of correcting a temperature reading from an onboard sensor of a device of a climate control system according to some embodiments.

Referring now to FIG. 4, a method 200 of adjusting a temperature reading from a sensor connected to a control device of a climate control system is shown. In some embodiments, method 200 may be practiced with thermostat 150 and HVAC system 100 (see e.g., FIGS. 1 and 3). Specifically, in some embodiments, method 200 may be performed (at least partially) by processor 160 of thermostat 150. In some embodiments, method 200 may be performed (at least partially) by other components of HVAC system 100 shown in FIG. 1, such as, for instance, controllers 106, 124, 126, I/O unit 107, or a combination thereof. In some embodiments, method 200 may be performed (at least partially) by a remote device (e.g., server, computer, tablet, laptop, smartphone, etc.). However, it should be appreciated that embodiments of method 200 may be practiced with other systems, assemblies, and devices other than those described above.

Initially, method 200 includes changing a power state of a device of a climate control system from off to on at 202. Generally speaking, changing the power state of the device comprises providing power (e.g., electrical power) to the device or some portion thereof. Thus, changing the power state at 202 may comprise actuating a switch (e.g., an electrical switch, breaker switch, etc.) or otherwise initiating (or re-initiating) the flow of electrical current to all or some of the electronic components within the device. In some embodiments, the device in block 202 may comprise a thermostat, such as thermostat 150 shown in FIG. 3. However, in other embodiments, the device at block 202 may comprise any suitable component, unit, or device of a climate control system that includes an on board temperature sensor as well as one or more other electronic components configured to generate heat during operation (e.g., such as those discussed above for HVAC system 100). When the power state of thermostat 150 is "off," no electrical current is provided to the electronic components thereof (e.g., display 152, processor 160, sensor 162, memory 156, for thermostat 150, etc.) so that no heat is being produced by the electronic components. However, when the power state of the thermostat 150 is "on" electrical current is flowing to one or more of the electronic components therein, resulting in the generation of heat.

Referring again to FIG. 4, method 200 next includes detecting a raw temperature of an environment surrounding the device with an onboard sensor at 204. For the thermostat 150 shown in FIG. 3, block 204 may include detecting a raw temperature with the temperature sensor 162. As previously described, a raw temperature detected by the temperature sensor 162 comprises a temperature of the environment within and immediately surrounding the device, and this raw temperature may be affected by heat generating components that are disposed within thermostat 150 (e.g., display 152, processor 160, memory 156, etc.). Accordingly, the raw temperature detected at 204 may be elevated compared with the temperature within the rest of the environment surrounding the sensor (e.g., the indoor space), such that an offset may be applied to provide an accurate temperature of the environment in question.

Next, method 200 includes determining whether to apply a dynamic offset to the detected raw temperature at 206. Specifically, upon the initial start-up or powering on of the device (e.g., thermostat 150), the internal temperature within the device may steadily rise for an initial period as the electronic components disposed therein heat up. Eventually, the heat output from the electronic components of the device may reach a steady state, such that a constant or relatively constant (or static) offset may be applied to the raw temperature detected thereafter by the sensor (e.g., temperature sensor 162). Prior to reaching this steady state, the temperature rise caused by the increasing heat output from the electronic components within the device may be dynamic over time, such that a dynamic (or changing) temperature offset may be applied to the detected raw temperature to ensure an accurate temperature measurement during this period. Thus, at 206, method 200 may determine whether a steady state has been reached for the heat rise so as to determine whether a dynamic offset is to be applied to the raw temperature from 204.

The determination at 206 may be accomplished in a number of different ways. In some embodiments, block 206 may include determining whether one or more conditions are satisfied. For instance, in some embodiments, the determination at block 206 may comprise determining whether a first predetermined threshold amount of time has passed since the device was last operated, or energized with electric current. Specifically, the determination at block 206 may including determining whether the following inequality is satisfied:

$$\Delta t < \Delta t_S \quad (1),$$

wherein $\Delta t$ is the amount of time that has passed since the device was last operated and $\Delta t_S$ is a first predetermined threshold amount of time. If the device was last operated within a relatively short period of time (e.g., within the first predetermined threshold amount of time $\Delta t_S$), it may be assumed that the heat output from the electronic components of the device may already be at (or relatively close to) the steady state levels. Thus, in this situation, there may be little or no dynamic temperature rise within the device as a result of operation of the electronic components disposed therein such that a static offset may be applied to the raw temperature detected at 204. In some embodiments, the first predetermined threshold amount of time $\Delta t_S$ may comprise 10 minutes or less, such as, for instance, 5 minutes or less, 3 minutes or less, 1 minute or less, etc.

The term "static offset" generally refers to a final steady state temperature offset or correction value that may be applied to the temperatures detected by the sensor within the device once the initial warm-up of the electronic components has completed. Thus, once the device reaches steady state operation, the static offset may be applied to account for the relatively stable amounts of heat generated by the other onboard electronic components. However, it should be appreciated that other corrections or dynamic changes may be applied the raw temperatures detected by the onboard sensor after steady state operation is reached within the device. For instance, additional dynamic corrections or changes may be applied to the offset during steady state operation as a result of changing air flow across the device. As a result, the "static offset" value may include some amount of dynamic correction over time; however, such corrections are generally not due to heat produced by electronic components within the device.

In addition, in some embodiments, the determination at block 206 may comprise determining whether a difference between the current raw temperature detected at 204 and the last temperature detected by the sensor when the device was last operated or energized is within a threshold temperature difference. Specifically, this determination at block 206 may include determining whether the following inequality is satisfied:

$$\Delta T < \Delta T_S \quad (2),$$

wherein $\Delta T$ is the difference between the current raw temperature detected at 204 and the last temperature detected by the sensor when the device was last operated, and $\Delta T_S$ is the predetermined threshold temperature difference. If the difference between the previous and current raw temperatures, $\Delta T$, is below a predetermined threshold (e.g., the predetermined threshold temperature difference $\Delta T_S$), this may indicate that the heat rise within the device, due to the internal electronic components, has already reached (or will very shortly reach) a steady state condition such that a static offset may be subtracted from the temperature detected at 204. In some embodiments, the predetermined threshold temperature difference $\Delta T_S$ at 206 may comprise 1° F. or less, such as, for instance 0.75° F. or less, 0.5° F. or less, 0.25° F. or less, etc.

In some embodiments, the determination at block 206 may be "No" (e.g., such that a dynamic offset is not to be applied) if both the inequalities of equations (1) and (2) above are satisfied. In these embodiments, the determination at block 206 may be "Yes" (e.g., such that a dynamic offset is to be applied) if at least one of the inequalities of equations (1) and (2) above is not satisfied. In some embodiments, the determination at block 206 may be "No" if at least one of the inequalities of equations (1) and (2) is satisfied. In these embodiments, the determination at block 206 may be "Yes" (e.g., such that a dynamic offset is to be applied) if both of the inequalities of equations (1) and (2) above are not satisfied.

Regardless, if it is ultimately determined at block 206 to not apply a dynamic offset to the raw detected temperature (i.e., the determination at block 206 is "No"), then method 200 may proceed to block 208 and subtract a static temperature offset value from the raw temperatures from 204. In some embodiments, the static temperature offset at block 208 may comprise a predetermined value based on the design of the device itself (e.g., thermostat 150). In addition, in some embodiments, the static temperature offset may be a value that is mathematically fit within a time and temperature relationship (e.g., such as the relationship shown in equation (5) discussed below). For instance, as described in more detail below, a time and temperature relationship may be mathematically fit to a start-up operation of the device (e.g. a cold-start operation as described in more detail below). As a part of this process, a value for the static temperature offset (an offset that is applied once steady state conditions are reached within the device) may be fit (or chosen) within the relationship. Thus, this previously fit or chosen value for the static offset may be utilized at 208 if it is determined that a dynamic offset is not to be applied at 206.

If, on the other hand, it is determined at block 206 to apply a dynamic offset to the raw temperature measurement from 204, then method 200 may proceed to block 210 to determine whether the power state change (e.g., the power state change at 202) is a cold start. As used herein, a "cold start" of the device of the climate control system (e.g., thermostat 150) comprises energizing or powering on the device after the device (and all components disposed therein) has cooled to ambient conditions. A cold start of the device may comprise an initial start-up, energization of the device at installation, or following a relatively long period of non-operation (e.g., such as after a long duration power failure). Conversely, as used herein a "warm start" of the device of the climate control system (e.g., again thermostat 150) comprises energizing or powering on the device when the device (and the components disposed therein) has not completely cooled to ambient conditions following a previous operation or energization of the device. Thus, a warm start of the device may comprise a start-up or energization of the device after a relatively short period since the last operation or energization (e.g., such as a short duration power failure). The determination at block 210 as to whether the power state change at block 202 is a cold start may then inform how to determine an appropriate dynamic offset to the raw temperature measurement from block 204.

The determination at 210 may be made in a number of different ways and by considering a number of different parameters. For instance, in some embodiments, the determination at block 210 may comprise determining whether a second threshold amount of time has passed since the device was last operated, or energized with electric current. Specifically, the determination at block 210 may including determining whether the following inequality is satisfied:

$$\Delta t > \Delta t_C \quad (3),$$

wherein Δt is the amount of time that has passed since the device was last operated and $\Delta t_C$ is the second threshold amount of time. The second threshold amount of time $\Delta t_C$ may be greater than the first threshold amount of time $\Delta t_S$ (see equation (1) above). In some embodiments, the second threshold amount of time $\Delta t_C$ may comprise 10 minutes or more, such as 12 minutes or more, 15 minutes or more, 20 minutes or more, etc. If the device has been powered down or de-energized for a significant amount of time (i.e., Δt is greater than the second threshold amount of time $\Delta t_C$ in equation (3) above), then it is assumed that the device has cooled enough such that the temperature of the electronic components disposed therein has reached ambient conditions. As a result, if the inequality of equation (3) above is satisfied, it may be determined that the power state change at 202 is a cold start at block 210.

In addition, in some embodiments, the determination at block 206 may comprise determining whether a difference between the current raw temperature detected at 204 and the last raw temperature detected by the sensor when the device was last operated or energized is approximately equal to the final offset for the temperature measurements when heat generation within the device has reached a steady state. Specifically, the determination at block 210 may including determining whether the following inequality is satisfied:

$$(T_F + X) \leq \Delta T < (T_F - X) \quad (4),$$

wherein $T_F$ is the final static offset applied to the raw temperature measurements when the heat rise within the electronic components of the device has reached a steady state, X is a predetermined error that is applied to the static offset $T_F$, and ΔT is again the difference between the current raw temperature measurement at 204 and the last raw temperature measurement taken by the sensor when the device was last operated as previously described above. The value for the static offset $T_F$ may be determined in the same manner as described above for block 208. Thus, the value $T_F$ may be predetermined based on the design of the device and/or maybe mathematically fit into a previously utilized time and temperature relationship during a so-called cold start of the device (see e.g., equation (5) below).

In some embodiments, the error X in equation (4) may range from 0% to 10% of the value for the static offset $T_F$; however, other quantities for the error X (e.g., above and below the range of 0-10% are contemplated herein). If the difference between the current raw temperature detected at 204 and the previous raw temperature via the sensor when the device was last operated is approximately equal to the static offset value $T_F$, and if one assumes that the heat rise within the device had reached steady state during the last operation, then it may be assumed that the electronic components within the device have cooled to ambient conditions. As a result, if the inequality of equation (4) above is satisfied, one may determine that the power state change at 202 is a cold start at block 210.

In some embodiments, the determination at block 210 may be "Yes" (e.g., such that the power state change is determined to be a cold start) if at least one of the inequalities of equations (3) and (4) above are satisfied. In other embodiments, the determination at block 210 may be "Yes" if both of the inequalities of equations (3) and (4) above are satisfied. In either case, if it is determined at block 210 that the power state change at 202 is a cold start (i.e., the determination at block 210 is "Yes") then method 200 proceeds to block 212 to perform a curve fit to generate a time and temperature relationship for the device per unit time. For instance, in some embodiments, the curve fit at block 212 is performed by taking a number of successive raw temperature measurements over a set time period (e.g., in addition to the initial temperature detected at 204), and then these data points are mathematically fit into the following relationships:

$$\text{Offset}_{Dynamic} = T_F(1 - e^{t/\tau}), \quad (5),$$

$$T_{Corrected} = T_{Raw} - \text{Offset}_{Dynamic} \quad (6),$$

wherein $T_F$ and τ are constants that are mathematically fit based on the measured raw temperature measurements over time, $T_{Raw}$ is the raw temperature measurement from the sensor (e.g., such as the detected temperature at 204), and $T_{Corrected}$ is the corrected temperature measurements following the subtraction of the computed dynamic temperature offset (i.e., Offset$_{dynamic}$). As previously described above, the value for $T_F$ may represent the final, static offset for the raw temperatures detected by the sensor after the heat rise within the device has reached a steady state. Thus, the fit value for $T_F$ may be used as the static offset at blocks 208 and within equation (4) that may be considered within block 210 as previously described above.

Following the curve fitting operation at block 212, method 200 proceeds to determine whether the fitted values from 212 are within predetermined bounds or ranges at 214. For instance, in embodiments where equation (5) represents the time and temperature relationship from block 212, the values of $T_F$ and T may be compared with predetermined bounds or ranges at 214. The predetermined bounds may be experimentally determined and saved within a suitable memory, such as, for instance memory 156 in FIG. 3 in some embodiments. If the fitted values (e.g., the values of $T_F$ and T in some embodiments) fall within these predetermined bounds (i.e., the determination at block 214 is "Yes"), method 200 proceeds to subtract computed dynamic temperature offsets from raw temperatures using the fitted values within the time and temperature relationship at 216. For instance, in embodiments where equation (5) represents the time and temperature relationship, the fitted values of $T_F$ and T may be utilized within equations (5) and (6) above to compute dynamic offsets (i.e., Offset$_{dynamic}$) that may be subtracted in block 218 from raw temperatures detected by the sensor.

Conversely, if one or both of the fitted values from the time and temperature relationship of block 212 fall outside of the predetermined bounds at 214 (i.e., the determination at block 214 is "No"), method 200 may proceed to 218 to subtract computed dynamic temperature offsets from raw temperatures using default values in place of the fitted values within the time and temperature relationship. For instance, in embodiments where equation (5) represents the time and temperature relationship, default values of $T_F$ and T may be utilized at block 218 in place of the fitted values from 212 if the values of $T_F$ and T fall outside the predetermined bounds at 214. In some embodiments, the default predetermined values for $T_F$ and T may be previously determined and specific to design or type of device (e.g., thermostat 150).

If it is determined at block 210 that the power state change at 202 is not a cold start (i.e., the determination at block 210 is "No"), it is assumed that the power state change at 202 is a so-called warm start as previously described above. In this situation, method 200 proceeds to block 220 to determine a time-offset of the raw temperature along a previously generated time and temperature relationship. For instance, in some embodiments, block 220 may comprise applying the time and temperature relationship utilized to compute offsets for raw detected temperature during the last cold start power state change for the device (see e.g., blocks 212-218). Specifically, the time and temperature relationship from the previous cold start of the device may comprise the relationships of equations (5) and (6) above (including previously fitted or default values for $T_F$ and $\tau$ as previously described above). Block 220 may comprise determining a suitable time-offset for the raw temperature measurement from 204 along the previously utilized time and temperature relationship. Specifically, in some embodiments, determining the time offset may comprise the following computation:

$$t_{\textit{Offset}} = \tau \ln\left(\frac{T_F}{-\Delta T}\right), \quad (7)$$

wherein $T_F$ and $\tau$ are constants that were either fitted or chosen during the last cold start of device (e.g., during a previous performance of blocks 212, 214), and $\Delta T$ is again the temperature difference between the raw temperature from 204 and the last temperature measurement from the sensor when the device was last operated or energized. Once the time offset value ($t_{\textit{Offset}}$) is calculated in block 220 (e.g., such as via per equation (7) above in some embodiments), method 200 advances to block 222 to subtract computed dynamic temperature offsets from raw temperatures using the previously utilized time and temperature relationship beginning at the time offset. For embodiments that utilize equation (5) as the time and temperature relationship, the offset may be computed by applying the time offset to equation (5) to generate suitable initial values for the dynamic offset for the raw temperature detected by the sensor.

As described above, through use of the systems and methods described herein, a raw temperature detected by an onboard temperature sensor of a device of a climate control system (e.g., thermostat 150 of HVAC system 100), may be corrected to account for heat output from other components within the device. Accordingly, a climate control system utilizing the above described systems and methods may be operated according to a more accurate temperature measurement, such that the overall operation of the climate control system may be enhanced.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A method of measuring a temperature with an onboard sensor of a device of a heating, ventilation, and air conditioning (HVAC) system, the method comprising:
   (a) changing a power state of the device from off to on;
   (b) detecting a raw temperature with the sensor after (a);
   (c1) deriving a predetermined time and temperature relationship during a previous operation of the device before (a), wherein the predetermined time and temperature relationship comprises $T_F(1-e^{-t/\tau})$, wherein $T_F$ and $\tau$ are constant values, and t is time since powering on the device at (a);
   (c2) determining a time offset along the predetermined time and temperature relationship for the device;
   (d) calculating a temperature offset with the predetermined time and temperature relationship at the time offset; and
   (e) subtracting the temperature offset from the raw temperature.

2. The method of claim 1, wherein deriving the predetermined time and temperature relationship comprises deriving values for $T_F$ and $\tau$ during the previous operation of the device before (a).

3. The method of claim 2, wherein (c2) comprises calculating the time offset with the relationship:

$$\tau \ln\left(\frac{T_F}{-\Delta T}\right),$$

wherein $\Delta T$ is a difference between the raw temperature and a previous temperature detected by the sensor during the previous operation of the device before (a).

4. The method of claim 1, comprising:
   (f) determining that a time difference between (a) and the previous operation of the device before (a) is below a first predetermined value; or
   (g) determining that a temperature difference between the raw temperature from (b) and a raw temperature detected by the sensor during the previous operation of the device before (a) is below a second predetermined value; and then
   (h) subtracting a predetermined static temperature offset from the raw temperature as a result of the determination in (f) or the determination in (g).

5. The method of claim 1, comprising:
   (i) changing the power state of the device from off to on before (a);
   (j) fitting one or more constant values of the predetermined time and temperature relationship with raw temperatures detected by the sensor per unit time; and
   (k) utilizing the one or more fitted constant values within the time and temperature relationship to calculate a temperature offset.

6. The method of claim 5, wherein (c2) comprises determining the time offset along the predetermined time and temperature relationship utilizing the one or more fitted constant values from (j); and
   wherein (d) comprises calculating the temperature offset with the predetermined time and temperature relationship utilizing the one or more fitted constant values from (j) at the time offset.

7. The method of claim 5, comprising:
   (l) determining whether the one or more fitted constant values are within predetermined bounds before (k).

8. A non-transitory machine-readable medium including instructions that, when executed by a processor, cause the processor to:
(a) detect a raw temperature of the environment surrounding a device of a climate control system with an onboard sensor upon a change in a power state of the device from off to on;
(b1) derive a predetermined time and temperature relationship during a previous operation of the device before (a), wherein the predetermined time and temperature relationship comprises $T_F(1-e^{-t/\tau})$, wherein $T_F$ and $\tau$ are constant values, and t is time since the power state change of the device at (a);
(b2) determine a time offset along the predetermined time and temperature relationship for the device;
(c) calculate a temperature offset with the predetermined time and temperature relationship at the time offset; and
(d) subtract the temperature offset from the raw temperature.

9. The non-transitory machine-readable medium of claim 8, wherein the instructions, when executed by the processor, further cause the processor to determine the time offset with the relationship:

$$\tau\ln\left(\frac{T_F}{-\Delta T}\right),$$

wherein $\Delta T$ is a difference between the raw temperature and a raw temperature detected by the sensor during the previous operation of the device before (a).

10. The non-transitory machine-readable medium of claim 8, wherein the instructions, when executed by the processor, further cause the processor to:
(e) determine that a time difference between (a) and the previous operation before (a) of the device is below a first predetermined value; or
(f) determine that a temperature difference between the raw temperature from (a) and a raw temperature detected by the sensor during the previous operation of the device before (a) is below a second predetermined value; and then
(g) subtract a predetermined static temperature offset from the raw temperature as a result of the determination in (e) or the determination in (f).

11. A thermostat for a heating, ventilation, and air conditioning (HVAC) system, the thermostat comprising:
a temperature sensor; and
a processor coupled to the temperature sensor, wherein the processor is configured to:
(a) detect a raw temperature of the environment surrounding the thermostat via the temperature sensor upon a change in a power state of the thermostat from off to on;
(b1) derive a predetermined time and temperature relationship during a previous operation of the thermostat before (a), wherein the predetermined time and temperature relationship comprises $T_F(1-e^{-t/\tau})$, wherein $T_F$ and $\tau$ are constant values, and t is time since the power state change of the thermostat at (a);
(b2) determine a time offset along the predetermined time and temperature relationship;
(c) calculate a temperature offset with the predetermined time and temperature relationship at the time offset; and
(d) subtract the temperature offset from the raw temperature.

12. The thermostat of claim 11, wherein the processor is configured to determine the time offset with the relationship:

$$\tau\ln\left(\frac{T_F}{-\Delta T}\right),$$

wherein $\Delta T$ is a difference between the raw temperature and a raw temperature detected by the sensor during the previous operation of the thermostat before (a).

13. The thermostat of claim 11, wherein the processor is configured to derive values for $T_F$ and $\tau$ during the previous operation of the thermostat before (a).

14. The thermostat of claim 11, wherein the processor is configured to:
(e) determine that a time difference between (a) and the previous operation of the thermostat before (a) is below a first predetermined value; or
(f) determine that a temperature difference between the raw temperature from (a) and a raw temperature detected by the temperature sensor during the previous operation of the thermostat before (a) is below a second predetermined value; and then
(g) subtract a predetermined static temperature offset from the raw temperature as a result of the determination in (e) or the determination in (g).

* * * * *